(12) United States Patent
Lee et al.

(10) Patent No.: US 10,009,128 B2
(45) Date of Patent: Jun. 26, 2018

(54) METHOD FOR REPORTING CHANNEL STATE REFLECTING INTERFERENCE CANCELLATION PERFORMANCE AND APPARATUS FOR SAME

(71) Applicant: LG ELECTRONICS INC., Seoul (KR)

(72) Inventors: Hyunho Lee, Seoul (KR); Kijun Kim, Seoul (KR); Hyungtae Kim, Seoul (KR); Hanjun Park, Seoul (KR); Kunil Yum, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 6 days.

(21) Appl. No.: 15/114,705

(22) PCT Filed: Mar. 3, 2015

(86) PCT No.: PCT/KR2015/002027
§ 371 (c)(1),
(2) Date: Jul. 27, 2016

(87) PCT Pub. No.: WO2015/133785
PCT Pub. Date: Sep. 11, 2015

(65) Prior Publication Data
US 2016/0344487 A1 Nov. 24, 2016

Related U.S. Application Data

(60) Provisional application No. 61/948,510, filed on Mar. 5, 2014.

(51) Int. Cl.
*H04B 17/309* (2015.01)
*H04B 17/382* (2015.01)
(Continued)

(52) U.S. Cl.
CPC ......... *H04B 17/309* (2015.01); *H04B 7/0626* (2013.01); *H04B 7/0632* (2013.01); *H04B 17/382* (2015.01); *H04W 24/10* (2013.01)

(58) Field of Classification Search
None
See application file for complete search history.

(56) References Cited

U.S. PATENT DOCUMENTS 9,749,030 B2 * 8/2017 Lee .................. H04B 7/0626
2013/0242902 A1 * 9/2013 Liu .................. H04W 24/10
370/329

(Continued)

FOREIGN PATENT DOCUMENTS

| KR | 20110030680 | 3/2011 |
| WO | 2013015626 | 1/2013 |
| WO | 2013048030 | 4/2013 |

OTHER PUBLICATIONS

LG Electronics, "Details of CSI Measurement and Report for TDD eIMTA," 3GPP TSG-RAN WG1 #74, R1-134386, Oct. 2013, 4 pages.

(Continued)

*Primary Examiner* — Eunsook Choi
(74) *Attorney, Agent, or Firm* — Lee Hong Degerman Kang Waimey

(57) ABSTRACT

Provided is a method for reporting a channel state, on which an interference cancellation performance is reflected, in a wireless communication system according to an embodiment of the present invention. The method may include: receiving, from a serving cell, a configuration for a channel state information (CSI) process (hereinafter, referred to as "enhanced CSI process") for reporting the channel state on which the interference cancellation performance is reflected; receiving a signal at a CSI-interference measurement (CSI-IM) resource according to the enhanced CSI process; and (Continued)

calculating a value of the reporting of the channel state on which the interference cancellation performance is reflected, by removing an interference signal, which is from a specific interference cell among one or more interference cells.

8 Claims, 7 Drawing Sheets

(51) Int. Cl.
H04B 7/06 (2006.01)
H04W 24/10 (2009.01)

(56) References Cited

U.S. PATENT DOCUMENTS

| | | | | |
|---|---|---|---|---|
| 2014/0078990 A1* | 3/2014 | Lee | | H04L 1/0026 370/329 |
| 2014/0126403 A1* | 5/2014 | Siomina | | H04W 24/10 370/252 |
| 2014/0177531 A1* | 6/2014 | Imamura | | H04W 24/10 370/328 |
| 2014/0185480 A1* | 7/2014 | Lee | | H04W 36/30 370/252 |
| 2014/0185528 A1* | 7/2014 | Shimezawa | | H04W 52/42 370/328 |
| 2014/0273869 A1* | 9/2014 | Zhao | | H04W 24/08 455/67.11 |
| 2014/0328327 A1* | 11/2014 | Xiao | | H04W 36/0088 370/332 |

OTHER PUBLICATIONS

CATT, "Summary of Email Discussion [74bis-02] CSI Measurement and Report for eIMTA," 3GPP TSG-RAN WG1 #75, R1-135054, Nov. 2013, 15 pages.

Huawei, "CSI Enhancements for TDD eIMTA," 3GPP TSG-RAN WG1 #75, R1-135012, Nov. 2013, 4 pages.

PCT International Application No. PCT/KR2015/002027, Written Opinion of the International Searching Authority dated May 14, 2015, 20 pages.

* cited by examiner

METHOD FOR REPORTING CHANNEL STATE REFLECTING INTERFERENCE CANCELLATION PERFORMANCE AND APPARATUS FOR SAME

CROSS-REFERENCE TO RELATED APPLICATIONS

This application is the National Stage filing under 35 U.S.C. 371 of International Application No. PCT/KR2015/002027, filed on Mar. 3, 2015, which claims the benefit of U.S. Provisional Application No. 61/948,510, filed on Mar. 5, 2014, the contents of which are all hereby incorporated by reference herein in their entirety.

TECHNICAL FIELD

The present invention relates to a wireless communication system, and more particularly, to a method for reporting a channel state reflecting interference cancellation performance and an apparatus for the same.

BACKGROUND ART

Various techniques including Machine-to-Machine (M2M) communication and various devices requiring a high data rate, e.g., smart phones and tablet Personal Computers (PCs), have emerged and gained popularity. As a consequence, the amount of data to be processed in a cellular network is rapidly increasing. To satisfy the rapidly increasing data processing requirement, Carrier Aggregation (CA), cognitive radio, etc. for efficiently using a larger number of frequency bands, and Multiple Input Multiple Output (MIMO), Coordinated Multipoint transmission and reception (CoMP), etc. for increasing the amount of data transmitted in limited frequencies have been developed. Furthermore, communication environments are evolving toward an increased density of nodes accessible by User Equipments (UEs). A node refers to a fixed point having one or more antennas and capable of transmitting or receiving radio signals to or from UEs. A communication system with densely populated nodes can provide high-performance communication services to UEs through cooperation between nodes.

This multi-node cooperative communication scheme in which a plurality of nodes communicate with a UE using the same time-frequency resources offers a higher throughput than in a conventional communication scheme in which each node operates as an independent Base Station (BS) and communicates with a UE without cooperation from other nodes.

A multi-node system performs cooperative communication by using a plurality of nodes, each of which is operating as a BS, an Access Point (AP), an antenna, an antenna group, a Radio Remote Header (RRH) or a Radio Remote Unit (RRU). Compared to a conventional centralized antenna system in which antennas are concentrated in a BS, the plurality of nodes are normally spaced apart from each other by a predetermined distance or more in the multi-node system. The plurality of nodes may be managed by one or more BSs or one or more BS Controllers (BSCs) that control operation of each node or schedule data to be transmitted or received through each node. Each node is connected to a BS or BSC that controls the node through a cable or a dedicated line.

The above-described multi-node system may be regarded as an MIMO system in the sense that distributed nodes can communicate with a single UE or multiple UEs by transmitting or receiving different streams at the same time. However, since signals are transmitted using nodes distributed to various locations, each antenna covers a reduced transmission area in the multi-node system, relative to antennas in the conventional centralized antenna system. As a result, each antenna may need a reduced Tx power in transmitting a signal in the multi-node system, compared to a conventional system that implements MIMO with a centralized antenna system. In addition, as the transmission distance between an antenna and a UE is reduced, path loss is decreased and high-rate data transmission is possible. Accordingly, the transmission capacity and power efficiency of a cellular system may be increased and communication may satisfactorily be performed with uniform quality irrespective of the locations of UEs within a cell. Furthermore, the multi-node system boasts of reduced signal loss during transmission because a BS(s) or BSC(s) connected to a plurality of nodes cooperate in data transmission and reception. Also, if nodes located apart from each other by a predetermined distance or more perform cooperative communication with a UE, correlation and interference between antennas are decreased. Consequently, the multi-node cooperative communication scheme achieves a high Signal-to-Interference plus Noise Ratio (SINR).

Owing to these advantages of the multi-node system, the multi-node system has emerged as a promising basis for cellular communication by substituting for the conventional centralized antenna system or operating in conjunction with the conventional centralized antenna system in order to reduce BS deployment cost and backhaul maintenance cost, extend service coverage, and increase channel capacity and SINR.

DISCLOSURE

Technical Problem

An object of the present invention is to provide a method for reporting a channel state reflecting interference cancellation performance.

The technical objects that can be achieved through the present invention are not limited to what has been particularly described hereinabove and other technical objects not described herein will be more clearly understood by persons skilled in the art from the following detailed description.

Technical Solution

A method for reporting a channel state reflecting interference cancellation performance in a wireless communication system according to one embodiment of the present invention is performed by a UE and comprises the steps of receiving, from a serving cell, a configuration for a channel state information (CSI) process (hereinafter, referred to as "enhanced CSI process") for reporting the channel state in which the interference cancellation performance is reflected; receiving a signal at a CSI-interference measurement (CSI-IM) resource based on the enhanced CSI process, the signal, which is received at the CSI-IM resource, including a downlink signal from the serving cell and interference signals from one or more interference cells; and calculating a value (hereinafter, referred to as "enhanced channel quality information (CQI)") of the channel state report in which the interference cancellation performance is reflected, by cancelling an interference signal, which is from a specific one of the one or more interference cells, from the downlink signal received at the CSI-IM resource, wherein the downlink signal from the serving cell includes a dummy signal or previously-known sequence signal, to which a limited parameter is applied.

Additionally or alternatively, the enhanced CQI may be calculated if a received power of the interference signal from the specific interference cell is same to or greater than a threshold value, and may be reported to the serving cell.

Additionally or alternatively, the received power of the interference signal from the specific interference cell may be measured at a measurement window corresponding to a predetermined frequency or time.

Additionally or alternatively, the enhanced CSI process may be cell-specific.

Additionally or alternatively, the method may further comprise the step of receiving information on the restricted parameter from the serving cell.

A UE configured to report a channel state reflecting interference cancellation performance in a wireless communication system comprises a radio frequency (RF) unit; and a processor configured to control the RF unit, wherein the processor is configured to receive, from a serving cell, a configuration for a channel state information (CSI) process (hereinafter, referred to as "enhanced CSI process") for reporting the channel state in which the interference cancellation performance is reflected, receive signal at a CSI-interference measurement (CSI-IM) resource based on the enhanced CSI process, the signal, which is received at the CSI-IM resource, including a downlink signal from the serving cell and interference signals from one or more interference cells, and calculate a value (hereinafter, referred to as "enhanced channel quality information (CQI)") of the channel state report in which the interference cancellation performance is reflected, by cancelling an interference signal, which is from a specific one of the one or more interference cells, from the downlink signal received at the CSI-IM resource, and the downlink signal from the serving cell includes a dummy signal or previously-known sequence signal, to which a limited parameter is applied.

Additionally or alternatively, the enhanced CQI may be calculated if a received power of the interference signal from the specific interference cell is same to or greater than a threshold value, and may be reported to the serving cell.

Additionally or alternatively, the received power of the interference signal from the specific interference cell may be measured at a measurement window corresponding to a predetermined frequency or time.

Additionally or alternatively, the enhanced CSI process may be cell-specific.

Additionally or alternatively, the processor may be configured to receive information on the restricted parameter from the serving cell.

The above technical solutions are merely some parts of the embodiments of the present invention and various embodiments into which the technical features of the present invention are incorporated can be derived and understood by persons skilled in the art from the following detailed description of the present invention.

Advantageous Effects

According to one embodiment of the present invention, a channel state reflecting interference cancellation performance can be reported, whereby system throughput improvement reflecting interference cancellation performance can be expected.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR CARRYING OUT THE INVENTION

Figure 1:
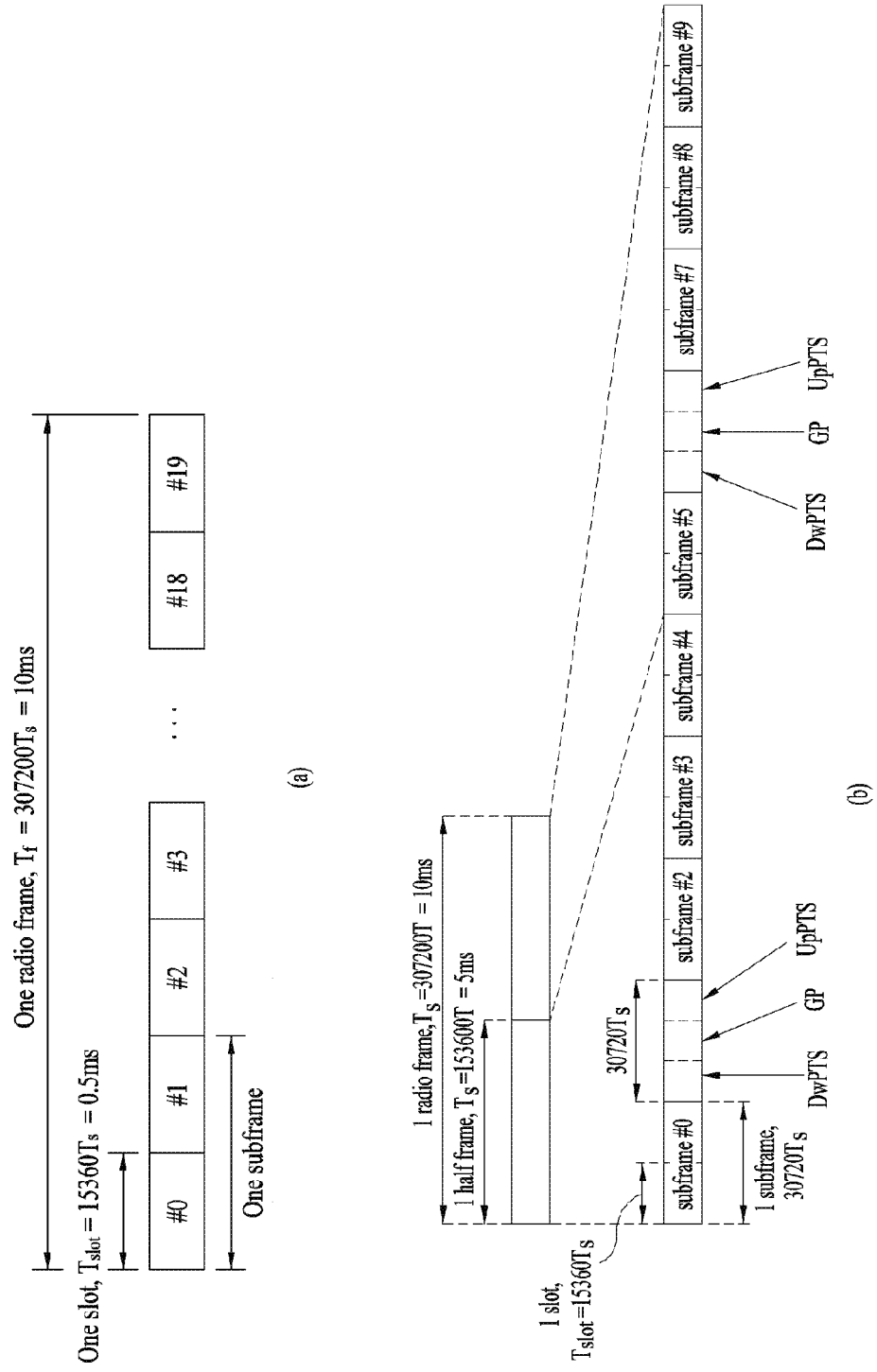
FIG. 1 is a diagram illustrating an example of a structure of a radio frame used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g. a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/ downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
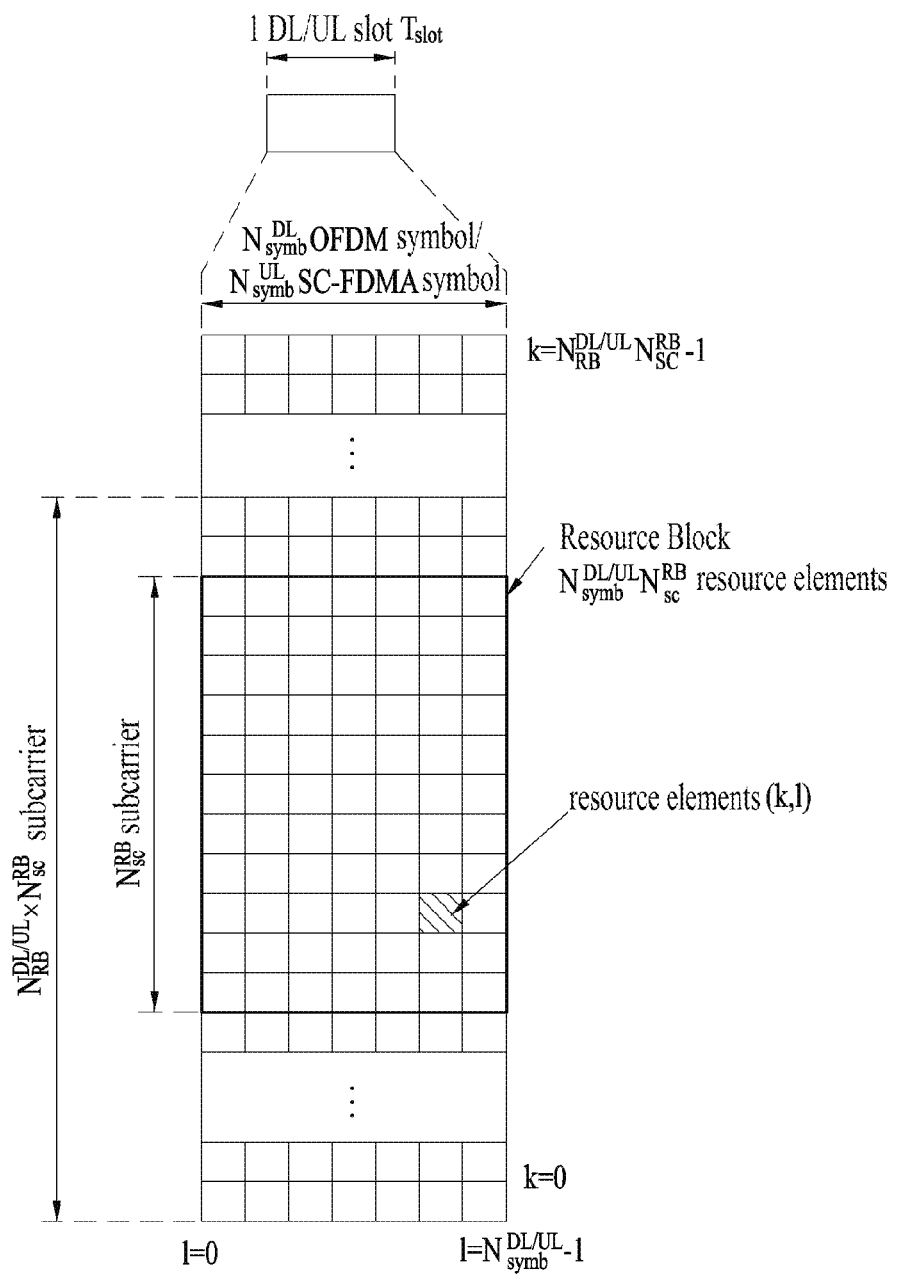
FIG. 2 is a diagram illustrating an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6

OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{RB}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
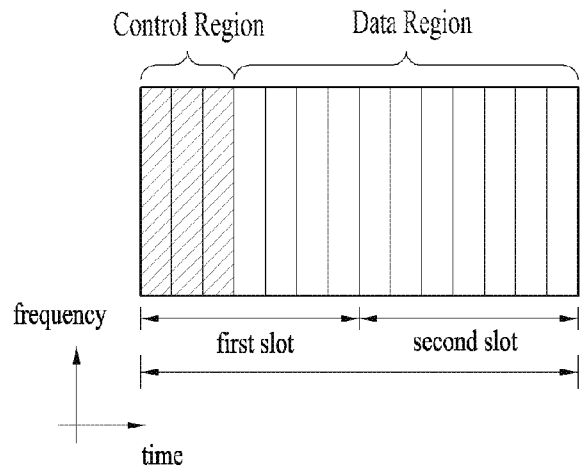
FIG. 3 is a diagram illustrating an example of a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
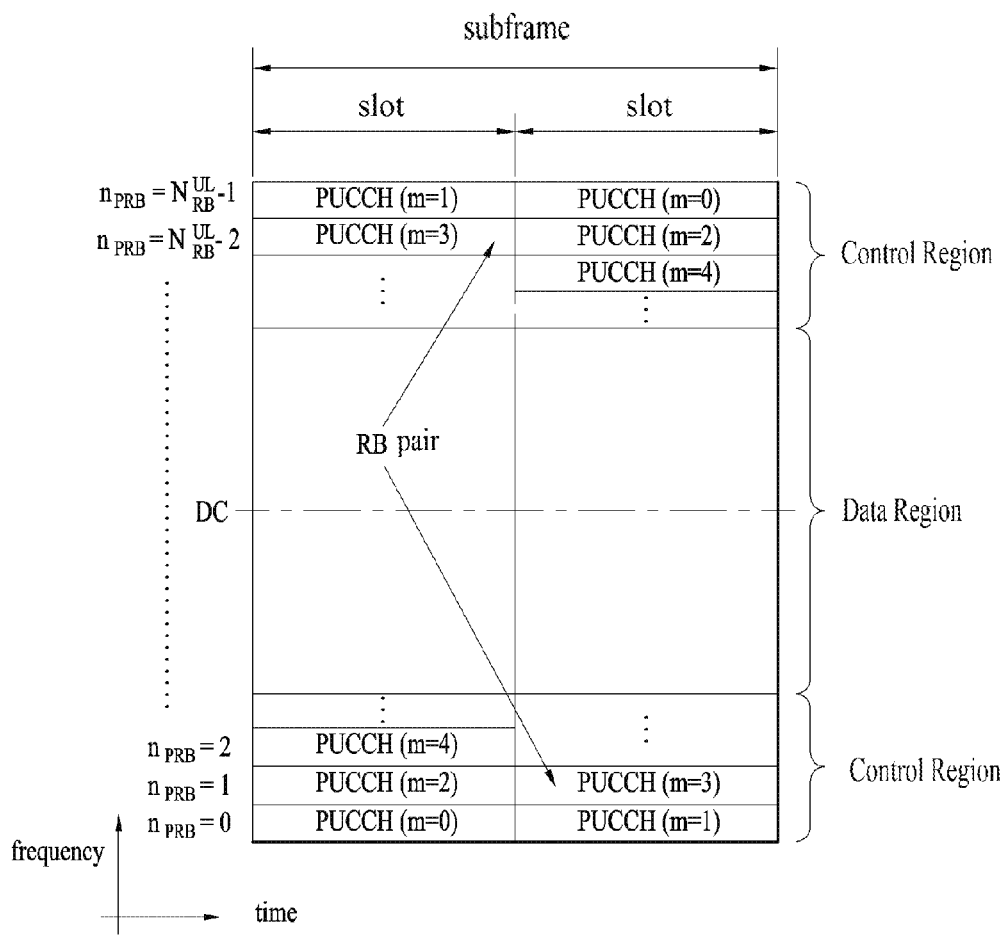
FIG. 4 is a diagram illustrating an example of an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MB-SFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CoMP (Coordinated Multiple Point Transmission and Reception)

In accordance with the improved system throughput requirements of the 3GPP LTE-A system, CoMP transmission/reception technology (also referred to as Co-MIMO, collaborative MIMO or network MIMO) has recently been proposed. The CoMP technology can increase throughput of a UE located at a cell edge and also increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the legacy LTE system, a method of enabling the UE located at the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNB) of a CoMP unit may use data. The CoMP unit refers to a set of eNBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

In addition, one case in which there are multiple UL points (i.e., multiple Rx points) is referred to as UL CoMP, and the other case in which there are multiple DL points (i.e., multiple Tx points) is referred to as DL CoMP.

CSI-RS(Channel State Information-reference Signal)

In 3GPP LTE(-A), the antenna port configured to transmit CSI-RS is referred to as a CSI-RS port, and the position of a resource contained in a predetermined resource region in which CSI-RS port(s) transmit(s) the corresponding CSI-RS(s) is referred to as a CSI-RS pattern or a CSI-RS resource configuration. In addition, time-frequency resources through which CSI-RS is allocated/transmitted are referred to as CSI-RS resources. For example, a resource element (RE) used for CSI-RS transmission is referred to as CSI-RS RE. Unlike CRS in which the RE position at which CRS per antenna port is transmitted is fixed, CSI-RS has a maximum of 32 different constructions so as to reduce inter-cell interference (ICI) under a multi-cell environment including a heterogeneous network environment. Different CSI-RS constructions are made according to the number of antenna ports contained in the cell, and contiguous cells may be configured to have different structures. Unlike CRS, CSI-RS may support a maximum of 8 antenna ports (p=15, p=15, 16, p=15, . . . , 18, and p=15, . . . , 22), and CSI-RS may be defined only for $\Delta f$=15 kHz. The antenna ports (p=15, . . . , 22) may correspond to CSI-RS ports (p=0, . . . , 7), respectively.

CSI-RS configuration may be varies according to the number of CSI-RS ports configured. There are 20 CSI-RS configurations if 2 CSI-RS ports are configured, there are 10 CSI-RS configurations if 4 CSI-RS ports are configured, and there are 5 CSI-RS configurations if 8 CSI-RS ports are configured. Numbers may be assigned to respective CSI-RS configurations defined by the number of CSI-RS ports.

The CSI-RS structures have nested property. The nested property may indicate that a CSI-RS structure for a large number of CSI-RS ports is used as a super set of a CSI-RS structure for a small number of CSI-RS ports. For example, REs configured to construct CSI-RS structure #0 regarding 4 CSI-RS ports are contained in resources configured to construct CSI-RS structure #0 regarding 8 CSI-RS ports.

A plurality of CSI-RSs may be used in a given cell. In the case of non-zero power CSI-RS, only CSI-RS for one structure is transmitted. In the case of zero-power CSI-RS, CSI-RS of a plurality of structures can be transmitted. From among resources corresponding to the zero-power CSI-RS, the UE proposes zero transmit (Tx) power for resources other than resources to be proposed as non-zero power CSI-RS. For example, in the case of a radio frame for TDD, no CSI-RS is transmitted in any one of a special subframe in which DL transmission and UL transmission coexist, a subframe in which a paging message is transmitted, and a subframe in which transmission of a synchronous signal, physical broadcast channel (PBCH) or system information block type1 (SIB1) collides with CSI-RS. The UE assumes that no CSI-RS is transmitted in the above subframes. Meanwhile, time-frequency resources used by the CSI-RS port for transmission of the corresponding CSI-RS are not used for PDSCH transmission, and are not used for CSI-RS transmission of other antenna ports instead of the corresponding CSI-RS port.

Time-frequency resources used for CSI-RS transmission are not used for data transmission, such that a data throughput is reduced in proportion to the increasing CSI-RS overhead. Considering this fact, CSI-RS is not constructed every subframe, and the CSI-RS is transmitted at intervals of a predetermined transmission period corresponding to a plurality of subframes. In this case, compared to the case in which CSI-RS is transmitted every subframe, the amount of CSI-RS transmission overhead can be greatly reduced. The above-mentioned subframe will hereinafter be referred to as a CSI-RS subframe configured for CSI-RS transmission.

A base station (BS) can inform a UE of the following parameters through higher layer signaling (e.g., MAC signaling, RRC signaling, etc.).

Number of CSI-RS ports

CSI-RS structure

CSI-RS subframe configuration $T_{CSI-RS}$

CSI-RS subframe configuration period $T_{CSI-RS}$

CSI-RS subframe offset $\Delta_{CSI-RS}$

If necessary, the BS (or eNB) may inform the UE of not only a CSI-RS configuration transmitted at zero power, but also a subframe used for transmission of the zero-power CSI-RS configuration.

CSI-IM (Interference Measurement)

For the 3GPP LTE Rel-11 UE, one or more CSI-IM resource structures may be configured. CSI-IM resource may be used to measure interference. The CSI-RS structure and the CSI-RS subframe structure (ICSI-RS) shown in FIG. 5 may be configured through higher layer signaling for each CSI-IM resource.

CSI Report

In a 3GPP LTE(-A) system, a user equipment (UE) reports channel state information (CSI) to a base station (BS) and CSI refers to information indicating quality of a radio channel (or a link) formed between the UE and an antenna port. For example, the CSI includes a rank indicator (RI), a precoding matrix indicator (PMI), a channel quality indicator (CQI), etc. Here, the RI indicates rank information of a channel and means the number of streams received by the UE via the same time-frequency resources. Since the value of the RI is determined depending on long term fading of the channel, the RI is fed from the UE back to the BS with periodicity longer than that of the PMI or the CQI. The PMI has a channel space property and indicates a precoding index preferred by the UE based on a metric such a signal to interference plus noise ratio (SINR). The CQI indicates the strength of the channel and means a reception SINR obtained when the BS uses the PMI.

Based on measurement of the radio channel, the UE may calculate a preferred PMI and RI, which may derive an optimal or best transfer rate when used by the BS, in a current channel state and feed the calculated PMI and RI back to the BS. The CQI refers to a modulation and coding scheme for providing acceptable packet error probability for the fed-back PMI/RI.

In a multi-cell environment wireless communication system in which a plurality of cells (for example, base station, eNB (evolved Node B) or transmission point (TP)) exist, a network assisted interference cancellation and suppression (NAICS) scheme has been recently discussed as one of inter-cell interference mitigation schemes. For example, in the current LTE-A standardization, a symbol-level interference cancellation (SLIC) technique has been discussed, in which a UE cancels a transmission signal of a neighboring cell at a symbol-level to mitigate an effect of a downlink interference signal of the neighboring cell. The UE may receive data at a high SINR as much as the cancelled interference. This means that the UE may quickly receive data at a more enhanced transmission rate than the conventional transmission rate.

Figure 5:
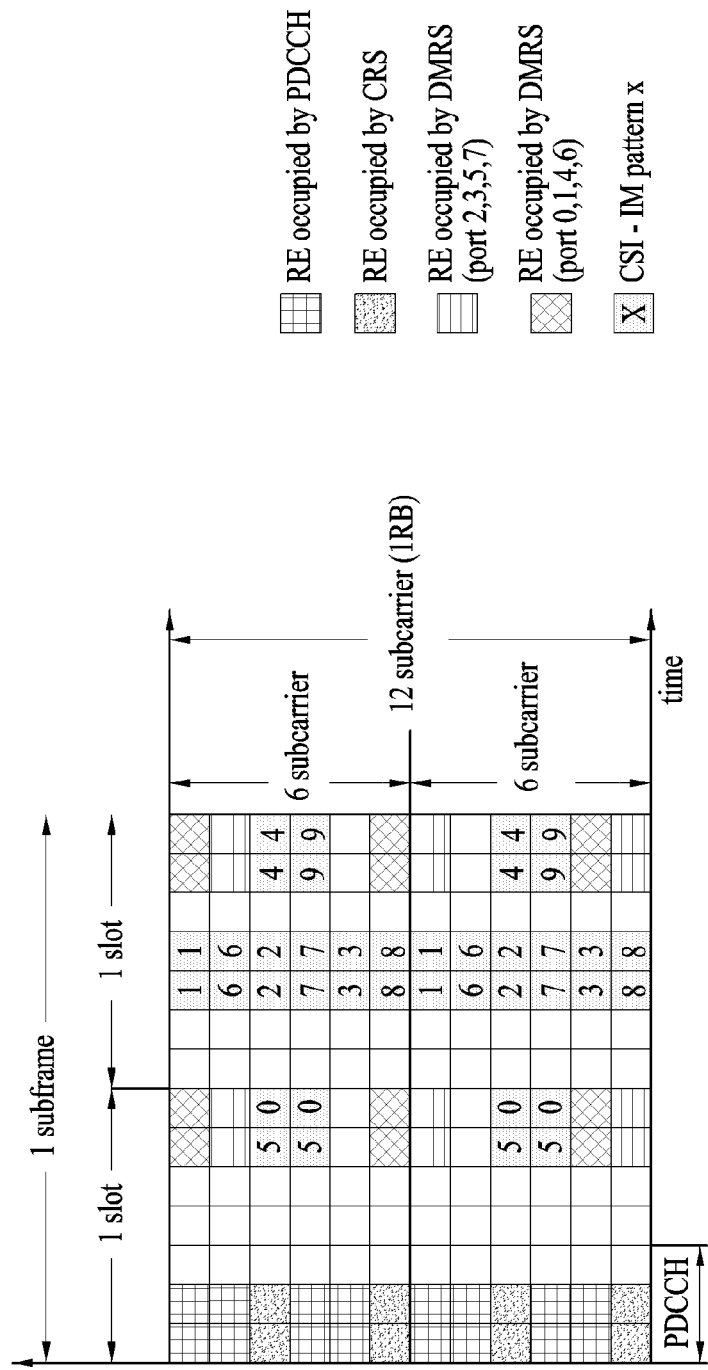
FIG. 5 is a diagram illustrating a pattern of a channel state information-interference measurement (CSI-IM)

For CSI reporting of the UE, the eNB configures a CSI process comprised of one CSI-RS resource for received signal measurement and one CSI-IM resource for interference measurement. The UE measures intensity of the signal received from the CSI-RS resource and its spatial property, and similarly measures intensity of an interference signal from the CSI-IM resource and its spatial property to determine RI, PMI and CQI of the corresponding CSI process and report the determined results to the eNB. At this time, the CSI-IM reserves four REs per RB at a subframe which is set, and if a normal CP is used, one of 10 possible 4-port CSI-RS patterns is designated by the eNB as shown in FIG. 5. Four REs given with the same number as one another in FIG. 5 are allocated to one CSI-IM.

In order that the UE cancels interference and receives data at a more enhanced transmission rate, feedback calculation which reflects partially cancelled interference or fully cancelled interference is required unlike the conventional feedback calculation. If the UE feeds a channel quality indicator (CQI) based on the conventional calculation method back without reflecting the interference cancellation/mitigation effect, this could lead to reporting of excessively passive (low) CQI, whereby gain of the SLIC scheme may not be obtained sufficiently. Therefore, it is important that the UE which supports the SLIC scheme calculates CQI of which interference is cancelled and feeds the calculated CQI back to the eNB so as to obtain gain by using the SLIC scheme.

Therefore, in a multi-cell environment wireless communication system in which a plurality of cells (for example, base station, eNB (evolved Node B) or transmission point (TP)) exist, when a specific UE may perform an NAICS operation for detecting and cancelling a neighboring cell interference signal in accordance with assistance of a network, the UE calculates CQI reflecting SLIC effect through interference measurement at an RE corresponding to the CSI-IM resource, and the eNB transmits a proper signal to the corresponding RE to support the calculated CQI. A method for this operation will be described. Hereinafter, detailed operations of the present invention will be described based on the LTE system, wherein the following operations may expansively be applied to a random wireless communication system that includes a UE with a high-fidelity receiver having interference cancellation capability.

In a multi-cell environment wireless communication system in which a plurality of cells exist, the UE which performs SLIC should measure intensity or power of an interference signal at the RE corresponding to the CSI-IM resource to calculate CQI of which interference is cancelled. At this time, the UE performs the SLIC operation for canceling a transmission signal of a neighboring cell that affects the UE, wherein the cell which transmits such an interference signal is referred to as "dominant interference cell", and CQI of which interference is cancelled is referred to as "enhanced CQI". The UE may cancel one or a plurality of neighboring cell transmission signals in accordance with its SLIC capability. Hereinafter, one dominant cell will be described exemplarily in the detailed operations of the present invention but the detailed operations of the present invention may expansively be applied to a random wireless communication system that includes a UE which performs transmission signal cancellation of the plurality of dominant interference cells.

Figure 6:
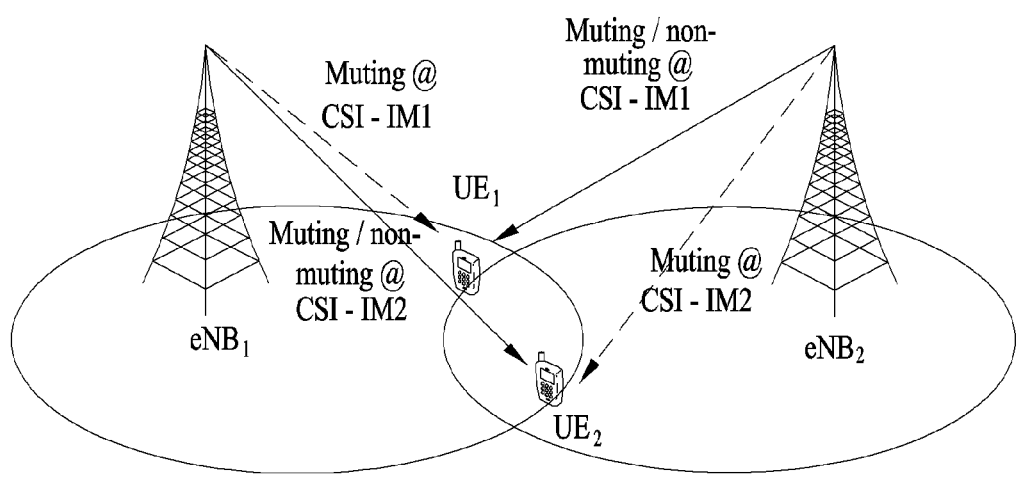
FIG. 6 is a diagram illustrating an operation of eNBs in CSI-IM.

In the conventional CSI reporting, a serving cell configures and mutes a zero-power CSI-RS at an RE position corresponding to CSI-IM as shown in FIG. 6 to easily interference of a UE. That is, $eNB_1$ performs muting at an RE corresponding to $CSI-IM_1$ configured in $UE_1$. Likewise, $eNB_2$ performs muting at an RE corresponding to $CSI-IM_2$ configured in $UE_2$. However, if interference is measured in this way, since the UE detects an interference signal from the dominant interference cell in a state that a signal scheduled to the UE, that is, a desired signal does not exist, it is difficult to reflect SLIC effect in CQI calculation. Therefore, to calculate CQI in which SLIC effect for cancelling the signal from the dominant interference cell is reflected, it may be preferable to transmit a signal of the serving cell to the RE for measurement of interference.

In this specification, a CSI process configured to calculate enhanced CQI in which the SLIC effect is reflected will be referred to as "enhanced CSI process", and CSI-IM which belongs to the enhanced CSI process will be referred to as "enhanced CSI-IM".

The present invention suggests that eNB configures an enhanced CSI process for a UE having SLIC capability and a serving cell transmits a signal to a corresponding enhanced CSI-IM resource at a subframe where an enhanced CSI-IM resource is configured. If the serving cell transmits the signal to the CSI-IM RE at the subframe where the enhanced CSI-IM resource is configured, in in a multi-cell environment wireless communication system in which C number of cells exist, a UE k which performs SLIC receives a signal at an RE corresponding to the enhanced CSI-IM resource as follows.

TABLE 5

$$y_k = \sum_{m=1}^{C} H_{k,m} P_m x_m + n_k = S + I_{dominant} + I_{oc}$$

In this case, $H_{k,m}$ means a downlink channel matrix between a cell m and the UE k. The UE may receive a signal comprised of a sum of a signal S from the serving cell, a signal $I_{dominant}$ from the dominant interference cell and signals $I_{oc}$ from the other neighboring cells, at the RE corresponding to the enhanced CSI-IM resource.

The following Table illustrates types of signals transmitted from the serving cell to the enhanced CSI-IM RE at the subframe where the enhanced CSI-IM resource is configured. Hereinafter, each case will be described in detail.

TABLE 6

| | Transmission signals of serving cell at enhanced CSI-IM RE |
|---|---|
| case 1 | Dummy signal to which the same modulation order/PMI/rank/TM as those of PDSCH are applied |
| case 2 | PDSCH |
| case 3 | Dummy signal to which restricted modulation order/PMI/rank/TM are applied |
| case 4 | Known sequence to which restricted modulation order/PMI/rank/TM are applied | case 1: The serving cell may transmit a dummy signal to which the same modulation order/PMI/rank/TM as those of a PDSCH of a corresponding RB to the RE corresponding to the enhanced CSI-IM for a subframe where the enhanced CSI-IM resource is configured.

case 2: The serving cell transmits the PDSCH of the corresponding RB at the subframe where the enhanced CSI-IM resource is configured. In this case, the UE may measure interference at the RE given without transmission rate loss of the serving cell.

In case of the cases 1 and 2, a UE which calculates enhanced CQI cannot know properties (modulation order, PMI, rank, etc.) of the signal from the serving cell at an RB which is not scheduled thereto. Therefore, the UE performs blind detection for the signal of the serving cell transmitted to the enhanced CSI-IM RE at the RB which is not scheduled thereto. Alternatively, the serving cell maintains modulation order/PMI/rank/TM by restricting scheduling at the subframe where the enhanced CSI-IM resource is configured, that is, uses modulation order/PMI/rank/TM, which are used for the PDSCH to the UE, for transmission at the enhanced CSI-IM resource, and notifies UEs, which will calculate enhanced CQI, of the information used for transmission at the enhanced CSI-IM resource by using a semi-static signal. This operation for restricting scheduling may expansively be applied to subframes other than the subframe where the CSI-IM resource is configured, whereby an effect caused by CQI mismatching between CQI calculation timing and actual scheduling timing may be minimized.

case 3: At the subframe where the enhanced CSI-IM resource is configured, the serving cell transmits a dummy signal to which restricted modulation order/PMI/rank/TM are applied, and notifies UEs, which perform SLIC, of the corresponding information by using a semi-static signal.

case 4: At the subframe where the enhanced CSI-IM resource is configured, the serving cell transmits a known sequence to which restricted modulation order/PMI/rank/TM are applied, and notifies UEs, which perform SLIC, of the corresponding information by using a semi-static signal. For example, the known sequence may be generated based on cell ID. If the known sequence is used, the UE may measure interference at the enhanced CSI-IM RE more exactly by perfectly cancelling a signal from its serving cell to allow a residual term not to remain.

Since the UE having SLIC capability for calculating enhanced CQI is expected to be configured for DMRS-based TM, in case of the cases 3 and 4, the serving cell transmits a signal to the enhanced CSI-IM RE by using the DMRS-based TM only. Alternatively, the serving cell may transmit a signal to the enhanced CSI-IM RE by using a CRS-based TM only.

Since the signal from the serving cell should be cancelled to measure interference in the enhanced CQI calculation, the UE should estimate a channel from the serving cell. To this end, channel estimation of the serving cell by means of the UE in accordance with the operation of the eNB at each RB within the subframe where the enhanced CSI-IM resource is configured may be defined as follows.

TABLE 7

| eNB | | |
|---|---|---|
| Transmission at PDSCH REs | Transmission at enhanced CSI-IM REs | Channel estimation of serving cell by means of UE for calculating enhanced CQI |
| DMRS based | DMRS based | Channel of serving cell from DMRS RE is estimated. For RB which is not scheduled, the serving cell notifies UE of DMRS pot and n_{SCID} value used for the corresponding RB by using semi-static signal. If the serving cell configures CSI-RS for UE by using the same CSI-RS subframe configuration as enhanced CSI-IM, the UE may estimate a channel of the serving cell from CSI-RS RE. |
| CRS based | DMRS based | Case where channel estimation does not occur |
| DMRS based | CRS based | Channel of serving cell from CRS is estimated. |
| CRS based | CRS based | Channel of serving cell from CRS is estimated. |
| no data | DMRS based | Channel of serving cell from DMRS RE is estimated. To this end, the serving cell transmits a signal to the DMRS RE. DMRS pot and n_{SCID} value used at this time may be fixed to one type, and the same value may be configured for the UE. If the serving cell configures CSI-RS for UE by using the same CSI-RS subframe configuration as enhanced CSI-IM, the UE may estimate a channel of the serving cell from CSI-RS RE. |
| no data | CRS based | Channel of serving cell from CRS is estimated. |

In order to calculate enhanced CQI in which interference cancellation capability of the UE is reflected, it is preferable that neighboring cells do not configure a CSI-RS to a RE corresponding to the CSI-IM resource for enhanced CQI calculation. This is because that CSI-RS cancellation capability not interference data cancellation capability of the UE may be reflected if the CSI-RS is configured for the RE corresponding to the CSI-IM resource.

An operation of the enhanced CSI process will be described in accordance with another embodiment of the present invention. The serving cell configures an enhanced CSI process for calculating enhanced CQI for the UE which performs SLIC, as follows.

The serving cell may configure an enhanced CSI process that includes the enhanced CSI-IM for the UE having SLIC capability. The serving cell may use a flag signal to notify the UE that the enhanced CSI process is a CSI process for the enhanced CQI, or may fixedly manage an RE position of the CSI-IM for calculating the enhanced CQI. Alternatively, the UE which may perform SLIC may expect that a CSI process having the greatest one of IDs has been configured as an enhanced CSI process for calculating the enhanced CQI.

The serving cell may configure the same RE position as an enhanced CSI-IM resource for UEs which are reported to have SLIC capability. This is to measure interference by using one CSI-RS pattern (or configuration) only by allowing the UEs which perform SLIC not to UE-specifically configure an RE corresponding to the enhanced CSI-IM resource when calculating the enhanced CQI, thereby minimizing transmission rate loss.

Since the serving cell according to the above operation may transmit a signal to the RE corresponding to the enhanced CSI-IM resource, if the same resource may be configured for the UE having no SLIC capability as the CSI-IM resource, interference may be overestimated. Therefore, it is preferable that the serving cell does not configure the RE corresponding to the enhanced CSI-IM resource for a release-10 UE or post-release-10 UE having no SLIC capability as the CSI-IM resource. Alternatively, if a subframe having an enhanced CSI-IM resource is scheduled to the release-10 UE or post-release-10 UE having no SLIC capability, the corresponding RE may be designated as ZP CSI-RS. It is preferable that the serving cell does not schedule the subframe having an enhanced CSI-IM resource to a pre-release-10 UE having no SLIC capability.

The serving cell may allocate the same CSI-RS subframe configuration for the enhanced CSI-M resource to UEs which perform SLIC within the serving cell to allow the UEs to measure interference at the corresponding subframe.

The UE which performs SLIC may detect and regenerate a signal S and a signal $I_{dominant}$ of the dominant interference cell from $y_k$, subtract the regenerated S and the dominant interference signal from the signal received from the RE corresponding to the enhanced CSI-IM resource, and then measure intensity or power of the interference signal for calculating the enhanced CQI.

To this end, the UE should know which one of neighboring cells transmits a dominant signal. That is, after determining the dominant interference cell, the UE uses the dominant interference cell to detect and regenerate the interference signal during SLIC operation by estimating a channel for the corresponding cell. The UE may receive cell ID and CRS frequency shift of the neighboring cells from the serving cell, measure a reference signal received power (RSRP), which is an average received signal power at an RS of each neighboring cell, by using the received data and use the measured RSRP to determine the dominant interference cell. However, if scheduling of the neighboring cells is varied for each RB, selection of the dominant interference cell through the conventional RSRP measurement may not be preferable.

Also, since the RSRP is a linear-averaged value in view of long-term and is a value measured for cell selection, reselection, handover, etc., it is difficult for the RSRP to normally reflect dynamic scheduling change of the neighboring cell, and selection of the dominant interference cell based on the RSRP may not be preferable. Therefore, the UE may measure an individual received signal power per a specific "frequency window" or "frequency or time window" when measuring the average received signal power, and may use the measured individual received signal power to select the dominant interference cell. A received signal power metric measured for the restricted "measurement window" such as "frequency window" or "frequency or time window" will be referred to as "enhanced RSRP". Therefore, the UE may perform calculation of the enhanced RSRP, as follows, to determine the dominant interference cell.

The UE may select the dominant interference cell through individual enhanced RSRP calculation by measuring the received signal power for each RB.

The UE may select the dominant interference cell through individual enhanced RSRP calculation by measuring the received signal power for each RBG. If scheduling of cells is limited to RBG unit for a certain subframe only through network coordination, the UE which performs SLIC may select the dominant interference cell by measuring the RSRP for each RBG.

The UE may select the dominant interference cell through individual enhanced RSRP calculation by measuring the received signal power for each precoding resource block group (PRG).

The UE may select the dominant interference cell through individual enhanced RSRP calculation by measuring the received signal power for each subband. If subband CQI report from the serving cell is configured for the UE, the UE may individually select the dominant interference cell by configuring RSRP measurement window for each subband unit.

The UE may calculate enhanced RSRP to which time as well as frequency is applied together with frequency when the measurement window is restricted. For example, time restriction may be limited to time set for CSI report or time indicated by a frequency resource. Alternatively, the serving cell may configure the time/frequency window for the enhanced RSRP as RRC signaling.

The dominant interference cell may be determined in consideration of the enhanced RSRP and traffic on/off. For example, the UE may select the dominant interference cell through enhanced RSRP comparison for a traffic-on cell only.

The dominant interference cell may be determined by a CSI-RS received power in consideration of an RRH deployment environment having the same cell ID. At this time, the measurement window of the aforementioned enhanced RSRP may be applied to CSI-RS received power measurement as it is.

The dominant interference cell may be determined by a DMRS received power in consideration of an RRH deployment environment having the same cell ID. At this time, the measurement window of the aforementioned enhanced RSRP may be applied to the DMRS as it is. If the enhanced RSRP is calculated using the DMRS, the serving cell assures DMRS-based TM scheduling within the corresponding frequency/time window.

In this case, a size of each of the RBG, the PRG and the subband is determined in accordance with a system bandwidth and defined as follows. The subband means a size of RB, to which the same PMI is applied, in PRB bundling in which the same PMI is applied to a plurality of neighboring RBs, and its size is determined in accordance with the system bandwidth.

TABLE 8

| System Bandwidth $N_{RB}^{DL}$ | RBG Size (P) |
| --- | --- |
| ≤10 | 1 |
| 11-26 | 2 |
| 27-63 | 3 |
| 64-110 | 4 |

TABLE 9

| System Bandwidth ($N_{RB}^{DL}$) | PRG Size (P') (PRBs) |
|---|---|
| ≤10 | 1 |
| 11-26 | 2 |
| 27-63 | 3 |
| 64-110 | 2 |

TABLE 10

| System Bandwidth $N_{RB}^{DL}$ | Subband Size (k) |
|---|---|
| 6-7 | NA |
| 8-10 | 4 |
| 11-26 | 4 |
| 27-63 | 6 |
| 64-110 | 8 |

Even though the UE uses the enhanced CQI, the UE may not be always assured of gain of SLIC. For example, if a signal power of the dominant interference cell is momentarily reduced or blind detection is failed due to a modulation order 64QAM, interference may be boosted, whereby inexact enhanced CQI may be calculated.

Therefore, in the present invention, the operation of the UE according to the enhanced RSRP measured or calculated for a specific frequency/time will be suggested as follows.

Alt 1: If the enhanced RSRP of the dominant interference cell, which is measured for a specific frequency/time, is less than a certain threshold, the UE may calculate the conventional CQI without calculating the enhanced CQI and report the calculated CQI to the serving cell. Alternatively, the UE for which multiple CSI processes are configured may skip a report for the corresponding CSI process.

If the enhanced RSRP of the dominant interference cell, which is measured for a specific frequency/time, is same to or greater than a certain threshold, the UE may calculate the enhanced CQI and report the calculated CQI to the serving cell.

Alt 2: If the enhanced RSRP of the dominant interference cell, which is measured for a specific frequency/time, is less than a certain threshold, the UE may calculate the conventional CQI without calculating the enhanced CQI and report the calculated CQI to the serving cell. Alternatively, the UE for which multiple CSI processes are configured may skip a report for the corresponding CSI process.

If the enhanced RSRP of the dominant interference cell, which is measured for a specific frequency/time, is same to or greater than a certain threshold and it is favorably determined that the UE performs SLIC at the time when CQI is calculated, the UE may report the enhanced CQI to the serving cell. If it is not favorably determined that the UE performs SLIC at the time when CQI is calculated, the UE may report the conventional CQI to the serving cell.

Alt 3: the UE for which the enhanced CSI process is configured may always report the enhanced CQI for the corresponding CSI process to the serving cell.

Figure 7:
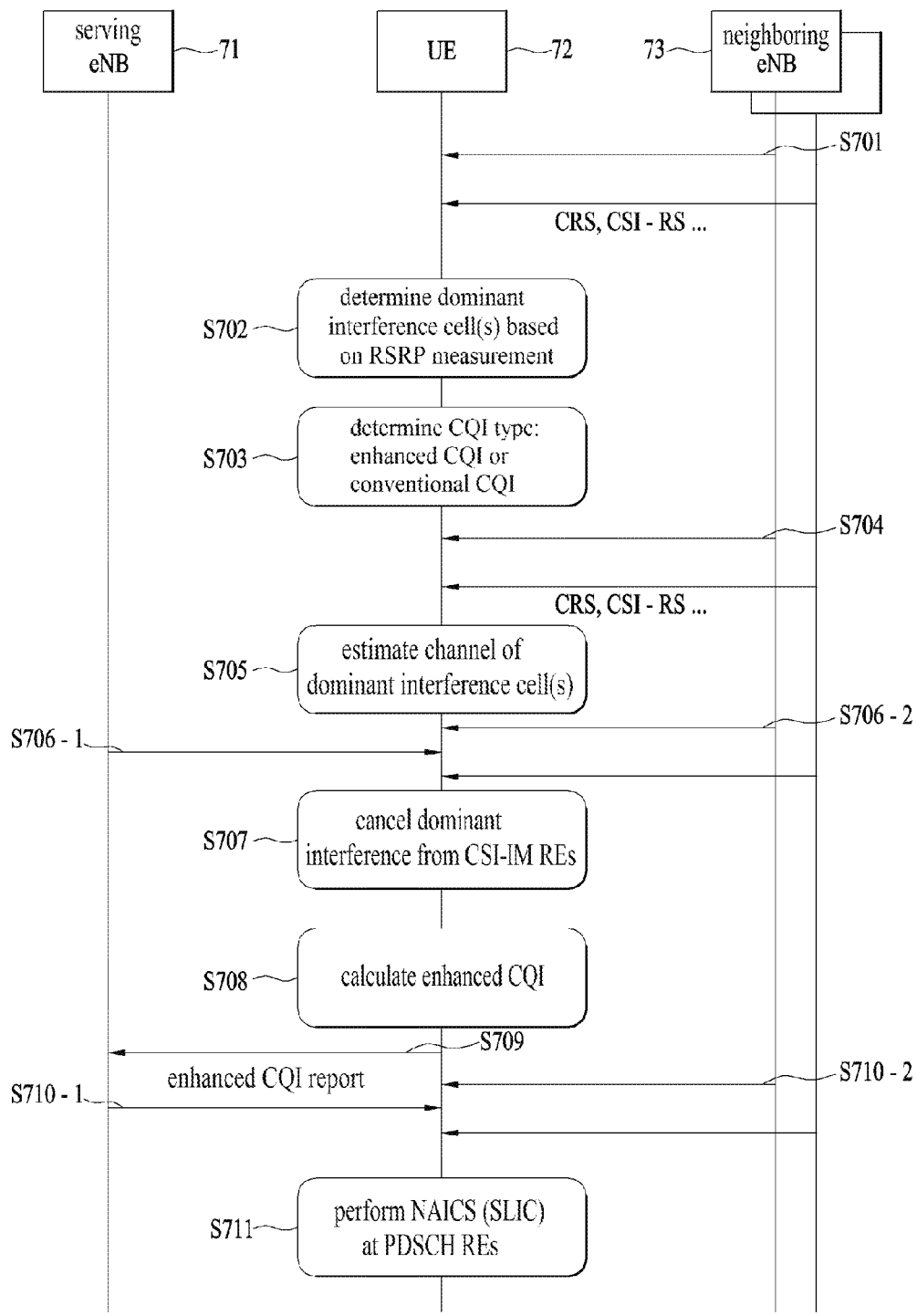
FIG. 7 is a diagram illustrating an operation according to one embodiment of the present invention.

FIG. 7 is a diagram illustrating a procedure of allowing a UE to calculate enhanced CQI in accordance with one embodiment of the present invention. Basically, the UE should estimate a channel of a corresponding dominant interference cell by estimating a channel of the serving cell and determining the corresponding dominant interference cell. As a result, the UE may calculate the enhanced CQI. The disclosure shown in FIG. 7 is implemented in accordance with at least one of the aforementioned embodiments of the present invention, and its detailed operation or procedure will be understood with reference to at least one embodiment of the present invention.

At least one neighboring cell, base station or eNB 73 (hereinafter, referred to as "neighboring cell") may transmit an RS such as CRS or CSI-RS (S701), and a UE 74 may determine a dominant interference cell by measuring an RSRP of the RS of the neighboring cell (S702). Also, the UE may determine whether to report enhanced CQI (that is, CQI reflecting interference cancellation performance) or the conventional CQI by comparing the RSRP of the neighboring cell determined as the dominant interference cell with a reference value (S703).

Hereinafter, it is assumed that the UE determines to report the enhanced CQI.

Then, the UE may receive an interference signal from the dominant interference cell (S704) and estimate a channel of the dominant interference cell (S705). In this case, the interference cell may be a CRS or CSI-RS transmitted from the dominant interference cell.

The UE may be configured as a CSI-IM resource by a serving cell, base station or eNB 71 (hereinafter, referred to as "serving cell"), and may estimate a channel of the serving cell from the corresponding CSI-IM resource. In order to estimate the channel of the serving cell from the CSI-IM resource, the serving cell should transmit a downlink signal from the CSI-IM resource as described above (S706-1). Also, the neighboring cell should transmit a downlink signal from the CSI-IM resource (S706-2), and should perform CSI-RS configuration for a resource corresponding to the CSI-IM resource.

The UE may cancel the interference signal of the dominant interference cell from a received signal or channel measured from the CSI-IM resource on the basis of channel estimation of the dominant interference cell (S707). Also, the UE may cancel the signal of the serving cell on the basis of channel estimation of the serving cell, and therefore may calculate enhanced CQI from a power of a residual interference signal (S708).

The UE may report the calculated enhanced CQI to the serving cell (S709). Afterwards, the serving cell may transmit a downlink signal scheduled for the UE on the basis of the enhanced CQI (S710-1), and the neighboring cell may transmit a downlink signal scheduled for its serving cell (S710-2). The UE may receive the downlink signal scheduled for itself by performing an interference cancellation operation (that is, NAICS or in more detail, SLIC) at PDSCH REs (S711).

In the above operation of the present invention, the serving cell transmits a proper signal at the RE corresponding to the CSI-IM resource and the UE measures interference at the CSI-IM resource. However, the present invention is not limited to the RE corresponding to the CSI-IM and may apply a specific RE configured by the serving cell to all systems used for measurement of interference.

Also, although the operation suggested in the present invention has been described with reference to FIG. 7, it will be apparent to those skilled in the art that at least one of the aforementioned embodiments may be applied to the operation related to FIG. 7.

Figure 8:
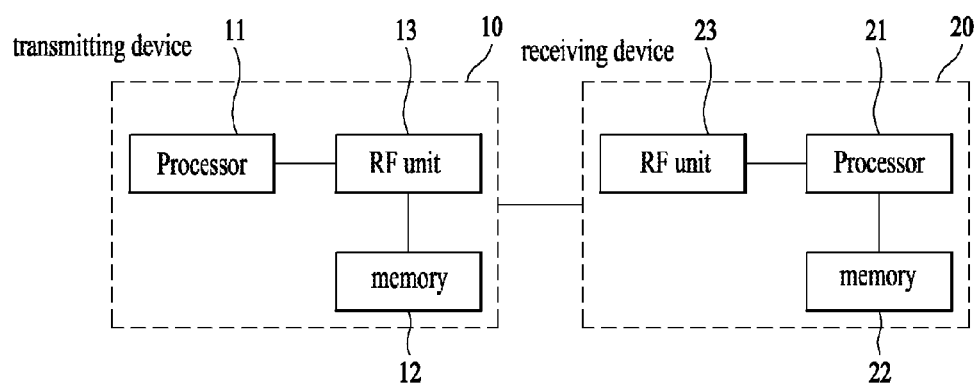
FIG. 8 is a block diagram illustrating an apparatus for implementing the embodiment(s) of the present invention.

FIG. 8 is a block diagram of a transmitting device 10 and a receiving device 20 configured to implement exemplary embodiments of the present invention. Referring to FIG. 8, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

What is claimed is:

1. A method for reporting a channel state reflecting symbol-level interference cancellation (SLIC) performance in a wireless communication system, the method being performed by a UE and comprising:

receiving, from a serving cell, a configuration for a channel state information (CSI) process (hereinafter, referred to as "enhanced CSI process") for reporting the channel state in which the SLIC performance is reflected;

receiving a signal in a CSI-interference measurement (CSI-IM) resource based on the enhanced CSI process, wherein the signal, which is received in the CSI-IM resource, comprises a downlink signal from the serving cell and interference signals from one or more interference cells;

cancelling an interference signal from the downlink signal received in the CSI-IM resource, wherein the interference signal is from a dominant interference cell of the one or more interference cells; and calculating a value (hereinafter, referred to as "enhanced channel quality information (enhanced CQI)") of the channel state report in which the SLIC performance is reflected, wherein the downlink signal from the serving cell comprises a dummy signal to which the same modulation order, precoding matrix indicator (PMI), rank as physical downlink shared channel (PDSCH) of the resource block (RB) are applied.

2. The method according to claim 1, wherein, if a received power of the interference signal from the dominant interference cell is same as or greater than a threshold value, the enhanced CQI is calculated and is reported to the serving cell.

3. The method according to claim 2, wherein the received power of the interference signal from the dominant interference cell is measured at a measurement window corresponding to a predetermined frequency or time.

4. The method according to claim 1, further comprising receiving information on a restricted parameter from the serving cell.

5. A UE configured to report a channel state reflecting symbol-level interference cancellation performance (SLIC) in a wireless communication system, the UE comprising:
  a radio frequency (RF) unit; and
  a processor configured to control the RF unit,
  wherein the processor is further configured to:
    control the RF unit to receive, from a serving cell, a configuration for a channel state information (CSI) process (hereinafter, referred to as "enhanced CSI process") for reporting the channel state in which the SLIC performance is reflected,
    control the RF unit to receive signal at a CSI-interference measurement (CSI-IM) resource based on the enhanced CSI process,
    wherein the signal, which is received in the CSI-IM resource, comprises a downlink signal from the serving cell and interference signals from one or more interference cells,
    cancel an interference signal from the downlink signal received in the CSI-IM resource,
    wherein the interference signal is from a dominant interference cell of the one or more interference cells, and
    calculate a value (hereinafter, referred to as "enhanced channel quality information (CQI)") of the channel state report in which the SLIC performance is reflected,
    wherein the downlink signal from the serving cell comprises a dummy signal to which the same modulation order/PMI/rank/TM as physical downlink shared channel (PDSCH) of the resource block (RB) are applied.

6. The UE according to claim 5, wherein, if a received power of the interference signal from the dominant interference cell is same as or greater than a threshold value, the enhanced CQI is calculated and is reported to the serving cell.

7. The UE according to claim 6, wherein the received power of the interference signal from the dominant interference cell is measured at a measurement window corresponding to a predetermined frequency or time.

8. The UE according to claim 5, wherein the processor is further configured to receive information on a restricted parameter from the serving cell.

* * * * *